United States Patent [19]
Briechle et al.

[11] Patent Number: 5,977,998
[45] Date of Patent: Nov. 2, 1999

[54] TECHNIQUE FOR COMMUNICATING WITH ELECTRONIC LABELS IN AN ELECTRONIC PRICE DISPLAY SYSTEM

[75] Inventors: George T. Briechle, New Canaan; David H. Lubowe, Westport, both of Conn.

[73] Assignee: Electronic Retailing Systems International, Inc., Norwalk, Conn.

[21] Appl. No.: 08/792,405

[22] Filed: Feb. 3, 1997

Related U.S. Application Data

[62] Division of application No. 07/995,048, Dec. 22, 1992, Pat. No. 5,632,010.

[51] Int. Cl.⁶ .................................................. G06F 13/14
[52] U.S. Cl. ................ 345/520; 345/513; 364/479.08; 705/21
[58] Field of Search .................................. 345/192, 193, 345/513, 197, 198, 1, 2, 3, 520; 340/825, 825.06, 825.07, 825.15, 825.17, 825.12; 364/468.22, 478.02, 478.03, 479.01, 479.06, 479.08, 479.11; 705/16, 20, 21, 409, 410, 411

[56] References Cited

U.S. PATENT DOCUMENTS

| | | | |
|---|---|---|---|
| 4,002,886 | 1/1977 | Sundelin | 235/383 |
| 4,346,453 | 8/1982 | Drapeau et al. | 705/28 |
| 4,500,880 | 2/1985 | Gomersall et al. | 340/825.35 |
| 4,682,162 | 7/1987 | Holloman | 345/82 |
| 4,783,740 | 11/1988 | Ishizawa et al. | 364/403 |
| 4,821,291 | 4/1989 | Stevens et al. | 375/259 |
| 4,887,208 | 12/1989 | Schneider et al. | 705/28 |
| 4,888,709 | 12/1989 | Revesz et al. | 395/114 |
| 4,962,466 | 10/1990 | Revesz et al. | 705/14 |
| 5,019,811 | 5/1991 | Olsson et al. | 340/825.17 |
| 5,021,775 | 6/1991 | Babin | 345/213 |
| 5,063,506 | 11/1991 | Brockwell et al. | 705/7 X |
| 5,111,196 | 5/1992 | Hunt | 340/825.35 |
| 5,134,387 | 7/1992 | Smith et al. | 345/83 |
| 5,172,314 | 12/1992 | Poland et al. | 705/1 X |
| 5,198,644 | 3/1993 | Pfeiffer et al. | 235/383 |
| 5,204,821 | 4/1993 | Inui et al. | 705/29 X |
| 5,241,467 | 8/1993 | Failing et al. | 705/1 |
| 5,241,657 | 8/1993 | Fine et al. | 345/501 |
| 5,245,534 | 9/1993 | Waterhouse et al. | 705/28 |
| 5,299,117 | 3/1994 | Farnbach | 705/20 |
| 5,335,170 | 8/1994 | Petterutwi et al. | 705/28 |
| 5,335,171 | 8/1994 | Fuyama | 705/20 |
| 5,348,485 | 9/1994 | Briechle et al. | 705/26 X |
| 5,544,041 | 8/1996 | Nekomoto | 705/1 |

FOREIGN PATENT DOCUMENTS

| | | |
|---|---|---|
| 299355 | 1/1989 | European Pat. Off. . |
| 2 638878 | 11/1990 | France . |
| 61-246857 | 11/1986 | Japan . |
| 2 255688 | 11/1992 | United Kingdom . |
| 2255668A | 11/1992 | United Kingdom . |
| WO 90/12354 | 10/1990 | WIPO . |
| 9305456 | 3/1993 | WIPO . |
| 9305475 | 3/1993 | WIPO . |

OTHER PUBLICATIONS

"Peripheral device displays", IBM Technical Disclosure Bulletin vol. 24, No. 2, pp. 1045–1046, XP000573374, Jul. 1981, New York, US.

Microsoft® Windows™ (Trademark of Microsoft® Corporation) 1989, pp. X, 101, 103, 115–120 & 123–125.

*Primary Examiner*—U. Chauhan
*Attorney, Agent, or Firm*—Oppedahl & Larson LLP

[57] ABSTRACT

In a system for displaying prices in a retail store, an improved protocol is disclosed to permit improved communications between a host, or central computer and display devices. Such a protocol enables the host to effectively communicate messages to the display devices for the latter to display information to consumers and/or store personnel.

22 Claims, 6 Drawing Sheets

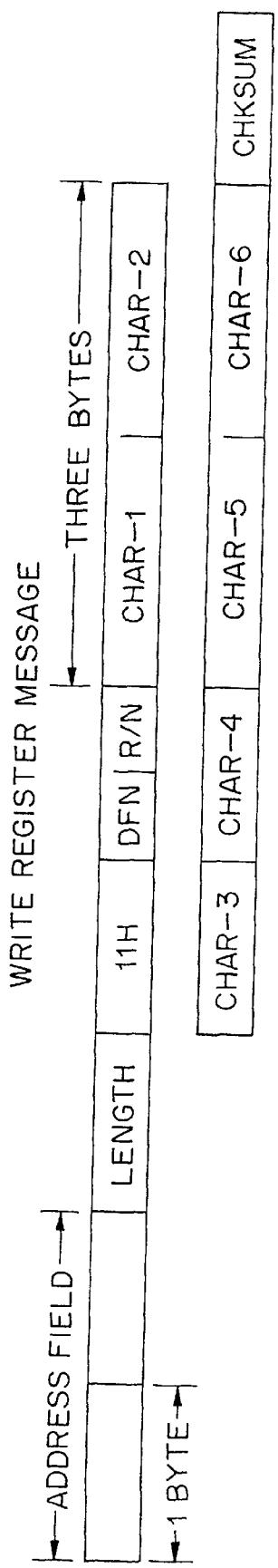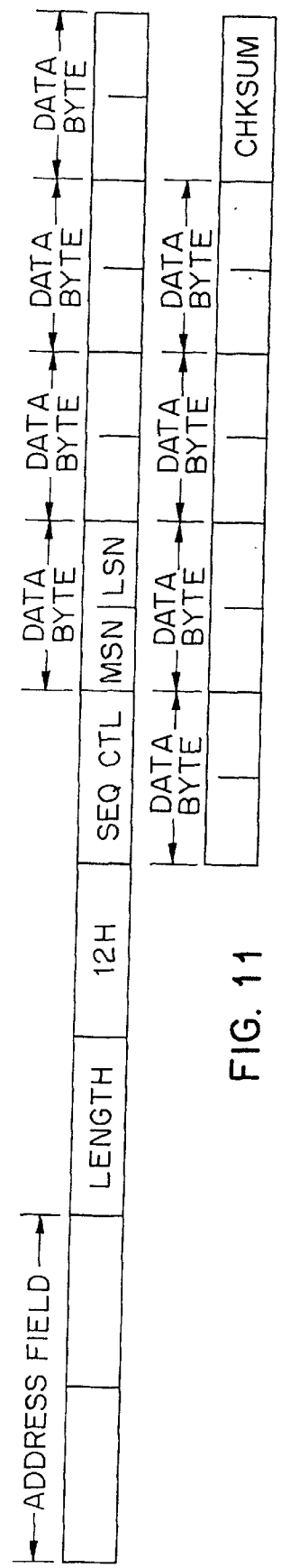
FIG. 9
FIG. 10
FIG. 11

| DATA BYTE | | | | | DWELL TIME |
|---|---|---|---|---|---|
| MOST SIGNIFICANT NYBBLE | LEAST SIGNIFICANT NYBBLE | | | | |
| REGISTER NUMBER (1–13) | 0 | 0 | 0 | 0 | 0.5 SEC |
| | 0 | 0 | 0 | 1 | 1.0 SEC |
| | 0 | 0 | 1 | 0 | 1.5 SEC |
| | 0 | 0 | 1 | 1 | 2.0 SEC |
| | 0 | 1 | 0 | 0 | 2.5 SEC |
| | 0 | 1 | 0 | 1 | 3.0 SEC |
| | 0 | 1 | 1 | 0 | 3.5 SEC |
| | 0 | 1 | 1 | 1 | 4.0 SEC |
| | 1 | 0 | 0 | 0 | 4.5 SEC |
| | 1 | 0 | 0 | 1 | 5.0 SEC |
| | 1 | 0 | 1 | 0 | 5.5 SEC |
| | 1 | 0 | 1 | 1 | 6.0 SEC |
| | 1 | 1 | 0 | 0 | 6.5 SEC |
| | 1 | 1 | 0 | 1 | 7.0 SEC |
| | 1 | 1 | 1 | 0 | 7.5 SEC |
| | 1 | 1 | 1 | 1 | HOLD. WAIT FOR BUTTON PRESS. CONTINUE TO NEXT DISPLAY. |

SELECT SEQUENCE MESSAGE

MODIFY SEQUENCE MESSAGE

TECHNIQUE FOR COMMUNICATING WITH ELECTRONIC LABELS IN AN ELECTRONIC PRICE DISPLAY SYSTEM

This application is a divisional of application Ser. No. 07/995,048, filed on Dec. 22, 1992, which is hereby incorporated by reference.

TECHNICAL FIELD

The present invention relates to communication protocols and particularly to a technique for effectively communicating messages to electronic labels for the latter to display information in an electronic price display system.

BACKGROUND OF THE INVENTION

Much attention has been given in recent years to systems used in retail stores for displaying prices of goods. While manual marking of the prices at the location of the goods, or on the goods themselves, is conventional, attempts have been made to use electronic means, instead, for displaying the prices at the goods location.

Some electronic pricing systems have been proposed to employ electronic labels or modules, each typically having a liquid crystal display, for displaying the prices. Buses for power and data are used in such systems to connect many thousands of such labels to a central computer for the latter to communicate with particular ones of the labels to, for example, request changes in their displayed prices. To this end, the labels are equipped with connectors so that they can be snapped onto one of many locations along rails which include the buses, and which run along the edges of store shelves. The connectors also provide the labels with electrical connections to the central computer through the buses.

In order to provide customers with helpful information such as brand names of the goods other than their prices, it is desirable to have an electronic label capable of displaying a string of characters, which may be too long to cover in one display screen and need to be divided into several screens. It is also desirable to have a broad selection of characters for display to achieve an effective conveyance of the information. It is undesirable however that while the string of characters for display is being updated, the label displays incomprehensible information. Accordingly, in order to coordinate the display function of individual labels well, it is important for the central computer to communicate effectively to them.

SUMMARY OF THE INVENTION

In accordance with the invention, communication from the central computer to labels is accomplished by sending messages addressed to the individual labels. The labels each comprise a screen having individually actuable character elements, combinations of which define different display characters, and at least one memory for storing data bits contained in the messages addressed thereto. In accordance with an aspect of the invention, each one of the character elements is associated with a different stored data bit in the memory. To display information on the screen, a subset of the character elements are turned on, namely, the ones which are associated with the stored data bits having a predetermined value.

In accordance with another aspect of the invention, each label includes a plurality of memories, each of which contains display data. A second message communicated from the central computer to a label contains pointer data which selects one of the memories in that label. A subset of the character elements on the label screen are turned on in response to the display data stored in the memory thus selected.

In accordance with still another aspect of the invention, each memory comprises a plurality of memory elements for storing display data. The memory elements are cyclically read in a certain order to display, on the label screen, information based on the display data stored therein. A third message communicated from the central computer to a label contains an indicator. Data contained in the third message is used to update certain contents of the memory elements of the label. When two or more of the memory elements are updated, the indicator causes the label to enter a freeze mode where the cyclical reading of the memory elements is temporarily stopped. The display thus remains visually unchanged despite the ongoing progress of receipt of data.

In accordance with a further aspect of the invention, a fourth message communicated from the central computer to a label includes a data field which comprises a sequence of data words. Each data word further includes a first subword and a second subword. First subwords of the data words identify memory elements of a selected memory. The subset of memory elements identified by the first subwords of the data words are read by the label in an order identical to that of those data words in the sequence. Second subwords of the data words define individual intervals during which the information based on the contents of the memory elements identified by the associated first subwords is displayed.

BRIEF DESCRIPTION OF THE DRAWING

In the drawing,

FIG. 9 is a second generalized message for writing data on to a subset of the registers of FIG. 7;

FIG. 10 is a decoding table for associating certain annunciators of the label of FIG. 2 and FIG. 3 with certain data bits in the second generalized message of FIG. 9;

FIG. 11 is a third generalized message for defining a display sequence to be displayed on the label of FIG. 2 and FIG. 3;

Throughout the figures of the drawing, the same reference numerals and characters are used where possible to denote like features, elements, components or portions of the illustrative embodiments.

DETAILED DESCRIPTION

Figure 1:
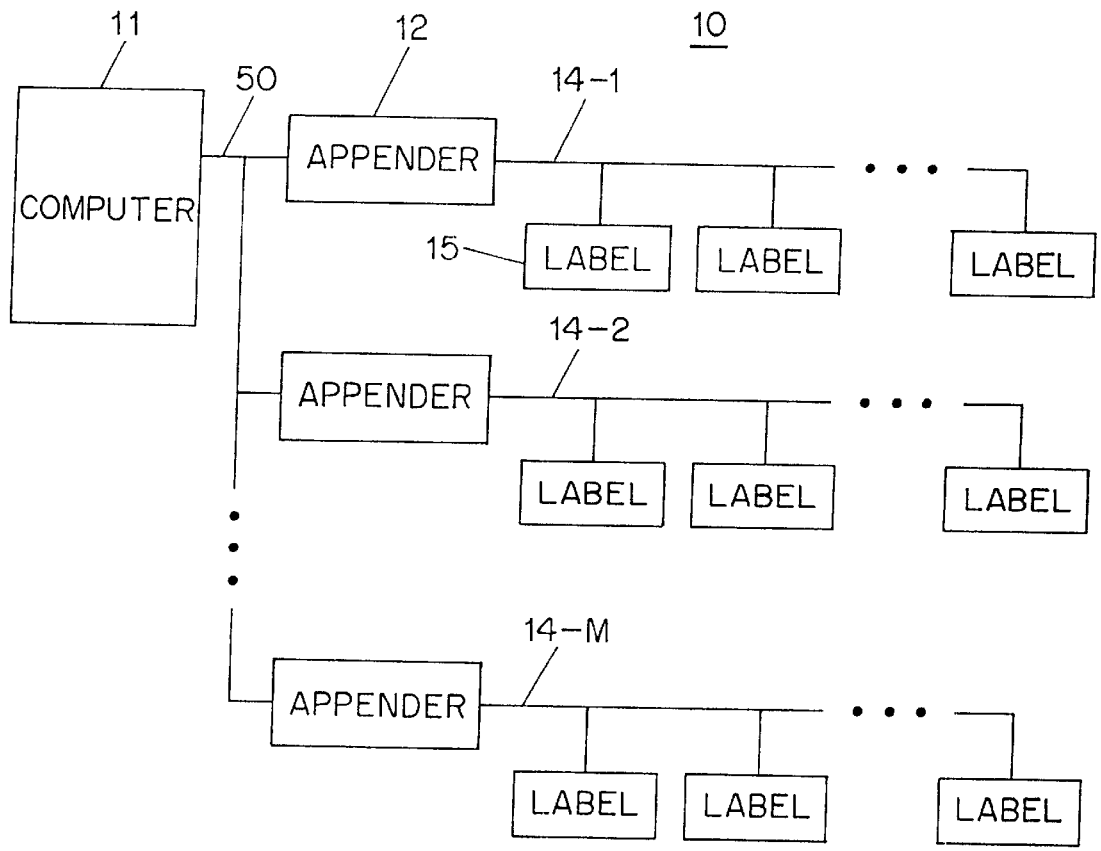
FIG. 1 is a block diagram of an electronic price display system embodying the principles of the invention.

FIG. 1 illustrates an electronic price display system 10 embodying the principles of the invention. System 10 may be employed in a retail store where goods for sale are placed on shelves. In FIG. 1, computer 11, which may be a conventional microcomputer with appropriate bus interface circuitry, is electrically connected to buses 14-1, 14-2 . . . , and 14-M in a multidrop arrangement, where M is an integer whose value is determined by a store planner. Each of these buses runs along the rail of a store shelf in the retail store.

As shown in FIG. 1, a myriad of labels are electrically connected to the buses. One such label is label 15 which is electrically connected to bus 14-1 in a manner to be described. In this illustrative arrangement, computer 11 can communicate with the labels through their respective buses. In addition, a multiplicity of appenders 12 are electrically connected between computer 11 and the labels. Specifically, one appender 12 is connected to each bus between computer 11 and the labels of that bus. It should be pointed out that all of the labels 15 may be structurally identical to one another, differing only in their unique bus addresses which are pre-assigned thereto for identification purposes. Similarly, all of the appenders 12 may be structurally identical to one another, differing only in their respective bus addresses. Bus 50 provides a bidirectional communication path between computer 11, also sometimes called a host, and an appender 12. Illustratively, appender 12 is electrically connected in such a manner to bus 50. In one embodiment there is an appender for each four-foot section of shelf rail in the store. For the purpose of the present discussion, it suffices to know that the function of an appender in system 10 is to append its bus address to a message to computer 11 sent by a label on the same bus as that appender. The appended bus address enables computer 11 to identify which bus the label that sent the message is on.

Figure 2:
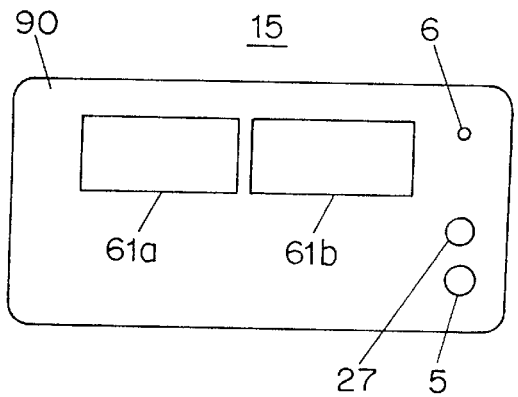
FIG. 2 is a front view of a label used in the system of FIG. 1.

FIG. 2 provides the front view of label 15. It comprises a dual display including display 61a and display 61b which are of a liquid crystal type, light emitting diode (LED) 6 which is controllable by the label, and push-buttons 5 and 27 whose functions are described hereinbelow. In addition, case 90 provides mechanical interconnection of the various parts of label 15.

Figure 3:
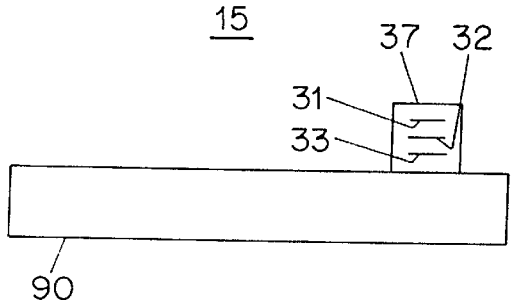
FIG. 3 is a top view of a label used in the system of FIG. 1.

FIG. 3 provides the top view of label 15. As shown in FIG. 3, label 15 has connector 37, whereby the label can be mechanically snapped onto one of many locations on the rail (not shown in FIG. 3) to be electrically connected to bus 14-1. On connector 37, springy contacts 31, 32 and 33 permit reliable electrical connection of label 15 of FIGS. 2 and 3 to the bus.

Figure 4:
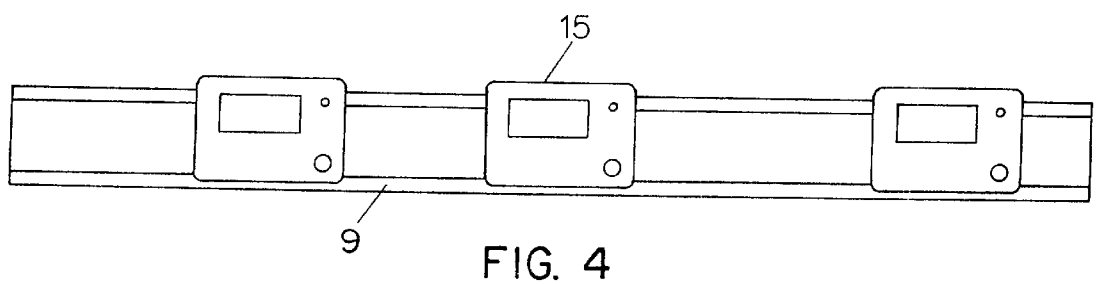
FIG. 4 is a front view of a portion of the system of FIG. 1, including a shelf rail and a plurality of labels in accordance with the invention.

FIG. 4 illustrates a physical disposition of label 15 and other labels on bus 14-1 on rail 9. Thus, label 15 may be used to display the prices of goods close thereto, which prices are communicated to it from computer 11 (not shown in FIG. 4).

Figure 5:
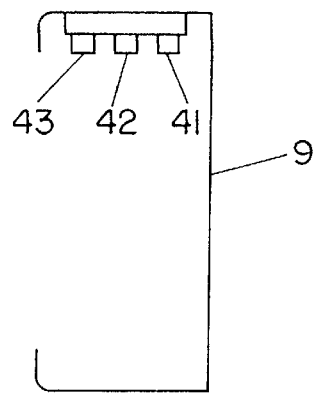
FIG. 5 is a cross-section of the shelf rail of FIG. 4.

FIG. 5 shows a cross-section of rail 9. Conductors 41, 42 and 43 run along the length of rail 9 and are positioned so as to be respectively connected to contacts 31, 32 and 33 of label 15 of FIG. 3.

Figure 6:
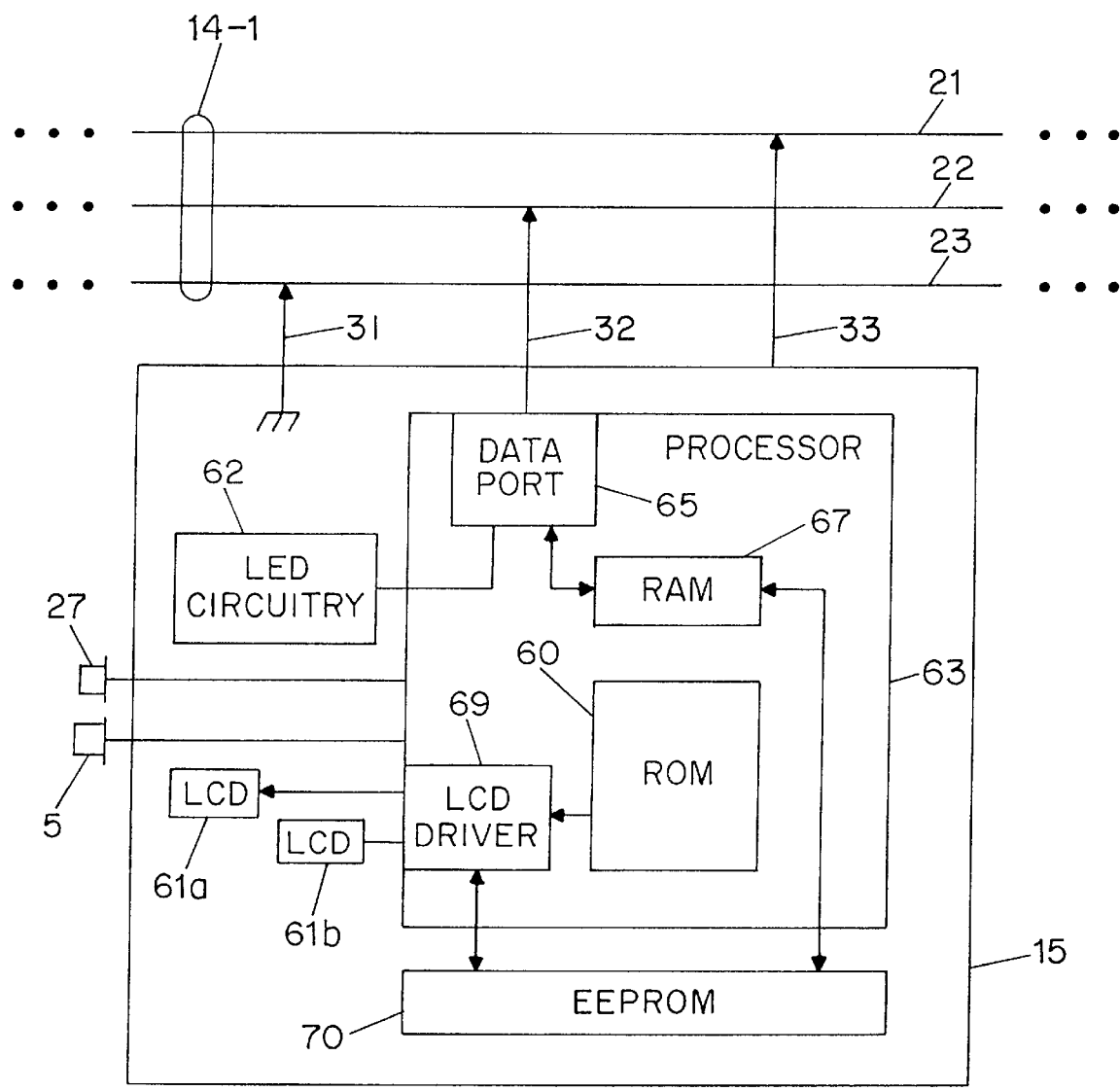
FIG. 6 is a block diagram showing detailed connection between a label and a bus in the system of FIG. 1.

FIG. 6 shows detailed connections of label 15 to bus 14-1. Illustratively, bus 14-1 comprises power line 21, data wire 22 and ground wire 23 which are, respectively, physically realized as conductors 43, 42 and 41 of rail 9 of FIG. 5. Specifically, line 21 transports electrical power from computer 11 (not shown in FIG. 6) to label 15 and other labels on bus 14-1; wire 22 transports messages between computer 11 and same; and wire 23 provides a ground or common line between computer 11 and the same.

Central to label 15 is processor 63 which, in this illustrative embodiment, comprises microprocessor LC5851N manufactured by Sanyo Electric Co., Ltd. Processor 63 includes, inter alia: data port 65, read only memory (ROM) 60, random access memory (RAM) 67, and liquid crystal display (LCD) driver 69. A full description of the functions and specifications of the microprocessor LC5851N may be found in a manual No. 3341, which is made available by Sanyo Electric co., Ltd. Semiconductor Overseas Marketing Division, and which is hereby incorporated by reference.

ROM 60, programmed permanently at the time of manufacture, contains a monitor program which orchestrates the basic operation of label 15 to perform different functions required thereof. One of these functions is to communicate messages with computer 11 asynchronously through springy contact 32. To this end, each message communicated between computer 11 and label 15 is sent to or retrieved from RAM 67 through the data port 65. The processor 63 properly formats the output messages in a standard serial protocol and recognizes the input messages in that same protocol.

EEPROM 70, also connected with processor 63, comprises a multiplicity of registers (not shown in FIG. 6). A particular one of the registers contains the identification of label 15 which represents its unique address on the bus in electronic pricing system 10. Other registers include display registers for storing, for example, price information to be displayed by LCD 61a and LCD 61b. EEPROM 70 preferably is a serial-in serial-out shift register memory, offering the advantage of a small pin count in its connection with processor 63. The unique identification is programmed by a several step process—the address is accumulated in RAM 67, and then stored in EEPROM 70, in response to a specific instruction received over the bus. It is anticipated that for a given label 15, the specific instruction would be given only once, so that the unique identification remains unchanged during the life of the label. Alternatively, the unique identification could be stored in some other form-jumpers in the printed wiring board of the label, or masked contents of ROM 60 being two examples.

While EEPROM 70 is shown as a separate piece part from processor 63, one skilled in the art will appreciate that one could, without departing from the scope of the invention, employ a processor with a built-in EEPROM instead. Other types of memory could be used instead of those described above. A battery-backed RAM could be used, for example, to store some or all of what are described above as stored in EEPROM. The processor's stored program could be in EEPROM, EPROM, OTPROM, or battery-backed RAM, for example, rather than the ROM described above.

The messages from computer 11 through data wire 22 to processor 63 may contain display data including information such as the prices of goods, price per unit of goods, etc.

Upon receiving such messages in RAM 67, the program therein extracts the display data, stores it in EEPROM 70, and provides it for LCD driver 69 to read. This driver accordingly provides electrode voltage levels to display the price and other information on LCD 61a and LCD 61b which are of conventional design. In this particular illustrative embodiment, each LCD character on LCD 61a and LCD 61b is made up of 11 segments which may be individually turned on or off by LCD driver 69 to realize a display character, which may be, for example, a numeral or an alphabetical letter. Each of LCD's 61a and 61b in the present embodiment can display up to 6 characters at a time. In addition, each LCD has annunciators including, for example, a dot symbol, a triangle symbol and a square symbol, which may be individually turned on or off by driver 69 as well.

Figure 7:
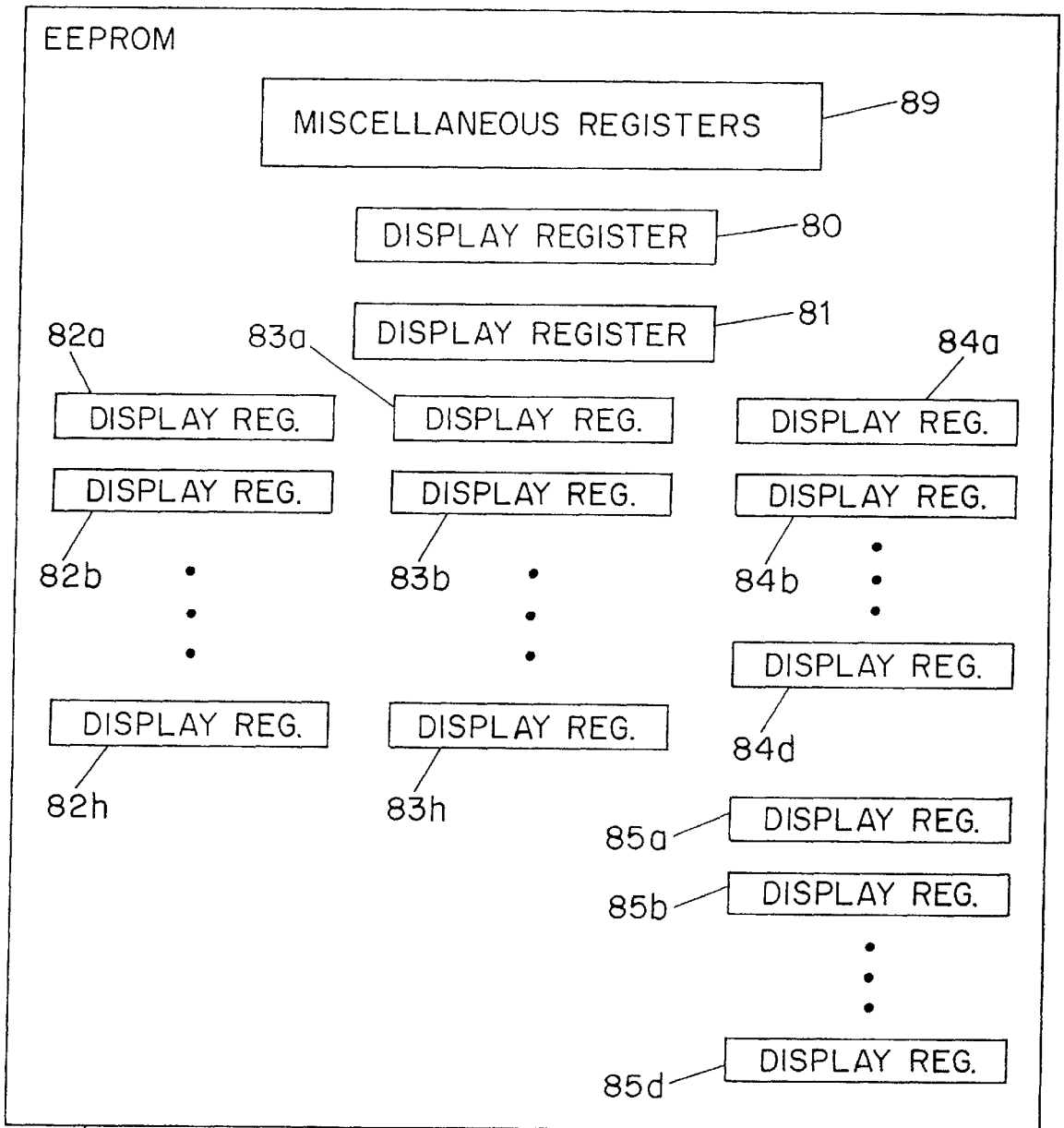
FIG. 7 is a block diagram illustrating an arrangement of registers in a memory of the label of FIG. 2 and FIG. 3.

The display data which determines the on/off condition of the individual character segments is stored in display registers of EEPROM 70. As shown in FIG. 7, EEPROM 70 comprises a multiplicity of registers including 4 arrays of display registers denoted 82a–82h, 83a–83h, 84a–84d and 85a–85d, and two individual display registers denoted 80 and 81. Other registers within EEPROM 70 are categorically denoted miscellaneous registers 89. Each display register of FIG. 7 can buffer up to 6 characters' worth of display data. In order to provide customers with helpful information including, for example, the brand name of a product and its price, it is oftentimes desired to display a sequence of more than 6 characters. In this particular embodiment, there are 4 display sequences which are hereinafter referred to as display sequences A, B, C and D, and whose data is stored at register arrays 82a–82h, 83a–83h, 84a–84d, and 85a–85d, respectively. This being so, the display sequences A and B each have a maximum length of 8 registers or 48 characters. The display sequences C and D each have a maximum length of 4 registers or 24 characters. A particular display sequence is displayed on LCD 61a or LCD 61b by having LCD driver 69 read the corresponding register array in a predetermined order, as will be described.

Referring back to FIG. 6, power line 21 provides power to label 15 through springy contact 33. The power is used, for example, to power LED 6 (not shown in FIG. 6) supported by conventional LED circuitry 62. Push-button 5 is a conventional switch for allowing a customer to change the displayed information LCD 61a from, for example, the price of the goods to their unit price. Push-button 5 when pushed creates an electrical signal level to processor 63. The program within ROM 60 polls the button periodically for detecting any such pressing of the button. Upon detection of the pressing of button 5, the program retrieves, for example, alternative price information from EEPROM 70 to be displayed by LCD 61a. Similarly, push-button 27, when pushed, causes LCD 61a to display other information which includes, for example, maintenance information, supplementary information for the consumers, etc. FIG. 6 also shows the connection of ground wire 23 to label 15 through contact 31.

Figure 8:
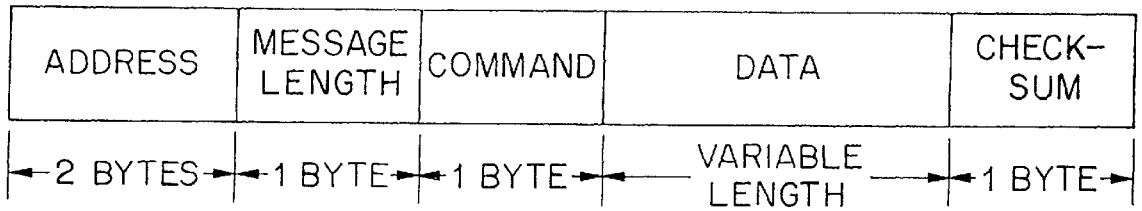
FIG. 8 is a generalized message used for communications in the system of FIG. 1.

In order for computer 11 to communicate messages effectively to individual labels for the latter to display information for the consumers, it is necessary to have an operative protocol conducive to the effective communications. The format of messages communicated between the labels and computer 11 will now be described. FIG. 8 illustrates a generalized message. As shown in FIG. 8, the generalized message is headed by a label address field which consists of 2 bytes. Specifically, if this message is transmitted by a label, the label address in that field indicates which label it is from. Otherwise, if this message is transmitted by computer 11, the label address indicates the label for which the message is intended. The address 0000H (hexadecimal) is reserved for addressing the labels in system 10 globally.

The label address field is followed by the message length field which is one byte long. This field indicates the length of the current message. The knowledge of the message length is important in that a message is normally split up and is sent byte by byte. With this knowledge, any device receiving a message is able to confirm that it has received a complete message by keeping track of the number of bytes received.

Following the label address field and the message length field is the command field which is one byte long. In messages originating at the computer 11, this field contains a command byte. In messages originating at a label, the command field contains a status byte indicative of the status of the label.

The command field is followed by the data field which is of a variable length. For example, the data field in a message from computer 11 to a label may contain the price information.

The last field of the message is the checksum field which is one byte long. This field, in a conventional manner, enables a message receiver, whether it be computer 11 or a label, to determine if the message was received without error.

Of course, the message format depicted by FIG. 8 is for illustrative purposes. Thus, it is appreciated that a person skilled in the art may devise a different format to suit a particular application, without deviating from the invention.

From time to time, computer 11 sends write register messages to the labels in system 10 to write new display data onto their display registers. A generalized write register message is shown in FIG. 9. The address field of this message identifies the label for which it is intended, and the length byte indicates the length of the message, as described before. However, in accordance with the invention, the most significant bit (MSB) of the length byte is designated as a freeze bit. Each label in system 10 includes a freeze flag in EEPROM 70 responsive to the freeze bit value. A freeze bit of a logic 1 sets the freeze flag in the label just identified. With the freeze flag being set, the label is able to receive multiple related write register messages, each updating a display register in its EEPROM, without displaying any of the new information until the complete set of messages has been received. Thus, the freeze bit of the length byte is used to indicate whether additional related messages are to be transmitted to the label. Specifically, when the freeze flag is set, the label will be in a freeze mode and driver 69 will stop reading display data from any display register arrays to prevent an unintended or meaningless sequence of characters from being displayed on the label.

During the freeze mode, the label displays on LCD 61a data from register 80 which is used for a temporary static display register storing price information in this particular embodiment, and on LCD 61b data from register 81 which is used for a temporary static display register storing unit price information. This being so, the price and unit price will always be available to consumers, even when the freeze bit is on. The label will remain in the freeze mode until the freeze flag is reset after receiving particular types of messages issued from computer 11, which include, for example, read status command messages for periodically eliciting status information from each label. When the freeze flag is reset, the label continues with its updated display sequence.

It is noteworthy that, in a situation involving an update of only one display register, the freeze bit of the write register message may be a logic zero, without setting the freeze flag. Accordingly, the display register which is being updated will have its data changed and used in any ongoing display sequence at the next occurrence of that register in that sequence. This advantageously allows a particular register, such as the one storing a price, to be changed instantaneously without stopping the display sequence. Alternatively, the freeze bit may be set if only one display register is updated if it is desired to temporarily hold the display in a freeze state.

The write register message is characterized by its command byte which is in this instance designated 11H. As shown in FIG. 9, the data field of this message contains 10 bytes which include: a display flag nybble (DFN) containing display flag information to be described (where a nybble consists of 4 bits), a register identification nybble (RIN) for identifying the display register for which the new display data is intended, followed by 9 bytes of display data representing 6 character words, which are denoted char-1 through char-6. Each character word is associated with one of the 6 11-segment characters on an LCD. In accordance with the invention, each character word consists of a character flag bit, and 11 data bits representing combinations of on/off conditions of the corresponding LCD character segments to realize different display characters. Specifically, each of the 11 data bits is associated with a segment of the corresponding LCD character. A data bit of a logic 1 indicates to LCD driver 69 to turn on or light its associated segment; otherwise, the segment remains to be turned off or dark. In this manner, the 11 data bits of a character word are bit-mapped to the corresponding 11 segments of a LCD character.

The character flag bit of each character word is used in this particular embodiment to indicate to LCD driver 69 to turn on or off an annunciator (not shown) on an LCD such as a decimal point, a currency sign, a virgule indicator or a "FOR" sign. Each character flag bit is associated with one such annunciator which is positioned immediately to the right of the corresponding character. By convention, a character flag bit of a logic 1 causes driver 69 to turn the associated annunciator on and, otherwise, it remains off.

The function of the above-mentioned DFN will now be described. It is used in this particular embodiment for promotional or identification purposes to support store operations. The individual bit patterns of the DFN represent combinations of ons/offs of the dot symbol, square symbol and triangle symbol annunciators, and LED 6. The decoding table for the DFN consisting of bit 0 through bit 3 is shown in FIG. 10. Any of these bits having a logic 1 will cause driver 69 to turn on the corresponding annunciator, in accordance with the table of FIG. 10. The remaining checksum byte in FIG. 9 is for error checking purposes as described before.

As mentioned before, each display sequence is oftentimes longer than 6 characters or one register's worth of display data. As such, each LCD needs to display a sequence of characters in parts. Specifically, characters from a first register in an array corresponding to the sequence are displayed for a selected period of time, followed by those from a second register for another selected period of time, and so on and so forth. Thus, the individual display periods, which are normally short, are determined by the dwell time allotted to the registers in the array. Computer 11 allots such dwell time to each display register in a label through a write sequence message. FIG. 11 shows a generalized write sequence message. As usual, the first two bytes of this message identify the label for which the message is intended, followed by a length byte indicating the length of the message. The MSB of this length byte is also designated as a freeze bit whose function is fully described hereinbefore.

The write sequence message is characterized by its command byte which is designated 12H. Following the command byte is a sequence control (SEQ CTL) byte identifying which of the four display sequences A, B, C, and D is being addressed. In this instance, the display sequence A is identified by a bit pattern 0001, the sequence B by a bit pattern 0010, the sequence C by 0011 and the sequence D by 0100. Specifically, the sequence identification is contained in the least significant nybble (LSN) of the SEQ CTL byte, and the most significant nybble (MSN) thereof is unused in the present embodiment.

The SEQ CTL byte is followed by a number of data bytes. These data bytes identify all or a subset of display registers in the array corresponding to the identified display sequence, and the dwell time for each of the registers just identified. As each data byte is associated with one of the display registers constituting the display sequence, the write sequence message of FIG. 11 having 8 such data bytes is for the display sequences A and B having a maximum of sequence length of 8 registers. Of course, the message is accordingly shorter when a sequence involves fewer than 8 registers. Specifically, the MSN of a data byte contains identification of a register which, in this instance, assumes one of the 13 bit patterns 0001 through 1101, despite the fact that only a subset thereof is used in the present embodiment. In accordance with another aspect of the invention, the order of the data bytes in the write sequence message defines the order of the corresponding registers to be read by LCD driver 69. The LSN of a data byte specifies the dwell time for the register identified by the MSN in the same data byte.

Figures 12, 16:
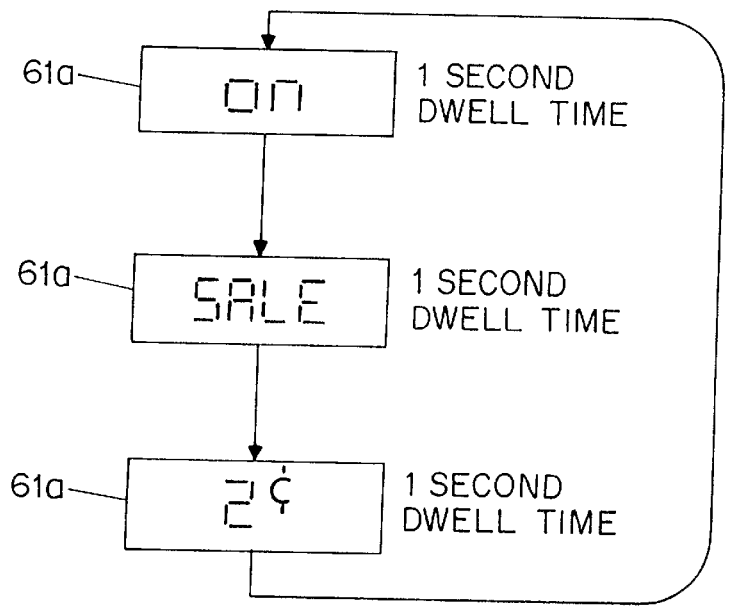
FIG. 12 is a decoding table for associating the display durations of characters in the display sequence with different data nybbles appearing in the third generalized message of FIG. 11.
FIG. 16 depicts the time-sequence of the particular displays as a result of the interworking depicted in FIG. 15.

FIG. 12 is a decoding table for the data bytes. As shown in FIG. 12, each LSN of a data byte is associated with a different dwell time. The LSN having a bit pattern 1111 indicates to LCD driver 69 to enter a hold state during which the current display characters will stay on the LCD. Once in the hold state, LCD driver 69 will not continue to read the next register in the sequence until either of buttons 5 and 27 is pressed. The last byte of the write sequence message of FIG. 11 is the checksum byte whose function is described hereinbefore.

Figure 13:
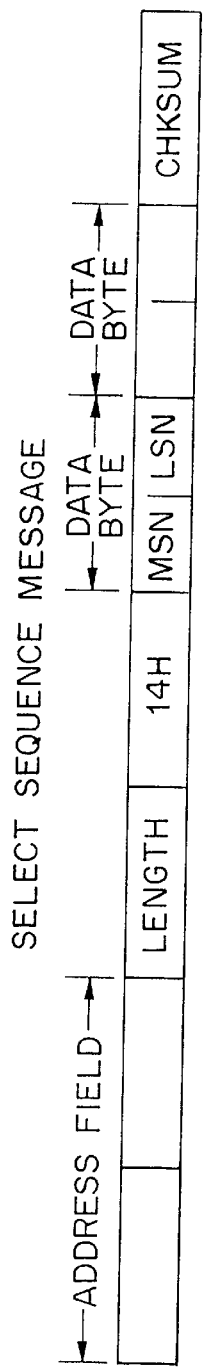
FIG. 13 is a fourth generalized message for selecting particular ones of the display sequences defined by the third generalized messages of FIG. 11 for display on the label of FIG. 2 and FIG. 3.

While the write sequence message defines each display sequence, a select sequence message from computer 11 selects which ones of the four display sequences A, B, C and D are to be respectively displayed on LCD 61*a* and LCD 61*b*. FIG. 13 shows a generalized select sequence message. In this message the command byte, which follows the above-described address field and length byte, is designated 14H. Following the command byte are two data bytes. The MSN of the first date byte identifies a display sequence to be displayed on LCD 61*a*, and the LSN identifies a second display sequence to be displayed on LCD 61*b*. The MSN of the second data byte identifies a third sequence to be displayed on LCD 61*a* for one sequence when button 5 is pressed, and the LSN identifies a fourth sequence to be displayed also on LCD 61*a* for one sequence when button 27 is pressed. As before, a bit pattern 0001 identifies the display sequence A, 0010 the display sequence B, 0011 the display sequence C and 0100 the display sequence D. The checksum byte of the select sequence message is, again, for error checking purposes as described before.

It is noteworthy that the data bytes of the select sequence message are stored in EEPROM 70 and are the default values used in the label on power up to select the sequences to be displayed on LCD's 61*a* and 61*b* in each instance. This message also clears the freeze flag of a label when set.

Figure 14:
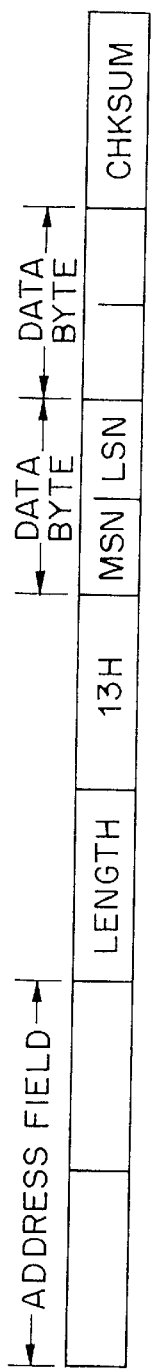
FIG. 14 is a fifth generalized message for modifying the display sequence selection specified by the fourth generalized message of FIG. 13.

The particular selection of the sequences defined by the select sequence message may be changed by a modify sequence message issued from computer 11. This message is generally used to cause a temporary change in the displays and particularly used with the global address 0000H to cause all labels to simultaneously change to preloaded maintenance displays in exigent circumstances. As shown in FIG. 14, the modify sequence message is characterized by its command byte which is designated 13H. Following the command byte are two data bytes. The MSN of the first data byte identifies a display sequence to be temporarily displayed for a predetermined period on LCD 61*a*, and the LSN identifies a second display sequence to be temporarily displayed on LCD 61*b*. Furthermore, the MSN of the second data byte identifies a third sequence to be temporarily displayed on LCD 61*a* when button 5 is pressed, and the LSN identifies a fourth sequence to be temporarily displayed also on LCD 61*a* when button 27 is pressed. The functions of the address field and the checksum byte of the modify sequence message are described hereinbefore and their description is thus omitted here. Finally, it should be pointed out that the data bytes of the modify sequence message, unlike those of the select sequence message, are stored in RAM 67 and therefore volatile.

Figure 15:
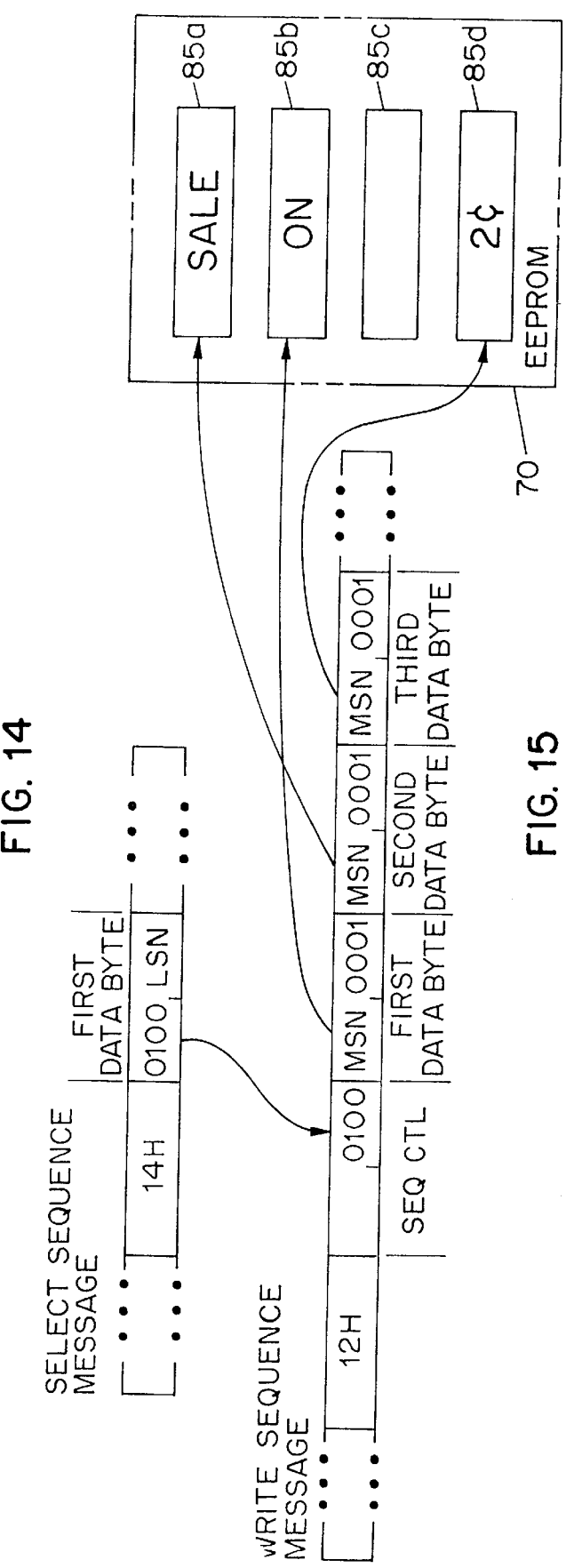
FIG. 15 depicts interworking of some of the above messages to the label of FIG. 2 and FIG. 3 to accomplish particular displays on the label in accordance with the invention.

An example demonstrating the communicative process whereby computer 11 causes label 15 to display the phrase "on sale 2¢" on LCD 61*a* will now be described. In this example, each of the words "on", "sale", and "2¢" will be cyclically displayed in a sequential order with a dwell time of a second. To this end, computer 11 sends to label 15 three individual write register messages, each of whose formats is identical to that of FIG. 9. Specifically, the first write register message having a command byte 11H comprises an RIN identifying register 85*a*, a char-2 having a bit pattern which will cause LCD 61*a* to display a character "S", a char-3 which will cause the LCD to display a character "A", a char-4 which will cause the LCD to display a character "L", and a char-5 which will cause the LCD to display a character "E". (The remaining char-1 and char-6 in this instance each assume a bit pattern 000H, thus keeping their corresponding characters turned off.) As shown in FIG. 15, after receiving the write register message, label 15 stores at register 85*a* in EEPROM 70 the four bit-patterns corresponding to the four characters "S", "A", "L" and "E" constituting the word "SALE". In a similar manner, the second write register message causes register 85*b* in the same array as register 85*a* to contain bit-patterns corresponding to the word "ON". Finally, the third write register message from computer 11 comprises an RIN identifying register 85*d*, and a char-4 having a bit pattern such that its character bit is of logic 1 and the rest of its bit pattern will cause the LCD to display a numeral "2". In this illustrative embodiment, the character bit of a char-4 in a write register message is associated with the "cent" sign annunciator (or ¢). By setting the character bit of the char-4 in the last message to a logic 1, the cent sign annunciator will be activated on the LCD along with the numeral "2" on its left.

It should be noted at this point that the words stored in the register array 85*a*–85*d* need not be in the same order as the words to be displayed. The actual display order is specified by a write sequence message whose command byte is 12H and whose format is similar to that of FIG. 11. In this write sequence message from computer 11 to label 15, the least significant nybble of the SEQ CTL byte assumes a bit pattern 0100 indicating that the display sequence D corresponding to the register array 85*a*–85*d* is being specified. Illustratively, this write sequence message has three data bytes indicating the order of displays and the dwell times associated therewith. The first data byte has an MSN identifying register 85*b* within the register array 85*a*–85*d*, which indicates that the content of register 85*b* or the word "ON" will be displayed first. The LSN of the first data byte assumes a bit pattern 0001 indicating that the display dwell time of the word "ON" will be a second long, in accordance with the table of FIG. 12. As a matter of fact, in this example each LSN of the three data bytes assumes a bit pattern 0001 because of the equal dwell time of a second long. Continuing the example, the second and third data bytes have their MSN's identifying register 85*a* and register 85*d*, respectively. This being so, the words "ON SALE 2¢" will be displayed in that order, as specified by the display sequence D.

In order to have "ON SALE 2¢" display on LCD 61*a* when no button is pressed, computer 11 issues to label 15 a select sequence message whose command byte is 14H and whose format is identical to that of FIG. 13. Specifically, the MSN of the first data byte assumes a bit pattern 0100 indicating that the display sequence D is selected for display on LCD 61*a* when neither of buttons 27 and 5 is pressed. FIG. 16 depicts the time-sequence of displays on LCD 61*a* as a result of the communication of the above messages from computer 11 to label 15.

The foregoing merely illustrates the principles of the invention and those skilled in the art will be able to devise numerous arrangements which, although not explicitly shown or described herein, embody the principles of the invention.

For example, label 15 in the above illustrative embodiment employs a dual display. It may be desirable to use a single display involving LCD 61*a* only. If such is the case, the respective data portions in the select sequence message and the modify sequence message relating to the display on LCD 61*b* may be ignored.

In addition, the LCD characters on either of LCD's 61*a* and 61*b* in the illustrative embodiment are made up of segments. In the event that the LCD characters are made up of elements other than segments, such as pixels in an array, the data bits of the character words in the display registers would be bit-mapped to the individual elements, in accordance with the invention.

Moreover, in the illustrative embodiment register 80 is a freeze display register and is designated to store, for example, price information for display on LCD 61*a* during the freeze mode. However, the designation of such a freeze display register need not be fixed. In an alternative embodiment, for example, a data nybble in the select sequence message of FIG. 13 is used to identify a selected one of the display registers in EEPROM 70 as the freeze display register. Illustratively, the LSN of the first data byte of the select sequence message is used for such identification purposes. Of course, in this alternative embodiment, the aforementioned function of this LSN to identify the second display sequence is removed. As a result, the second display sequence is predeterminedly designated to be one of the display sequences A, B, C, and D. Alternatively, the select sequence message may be lengthened to include an additional data byte wherein a nybble thereof is used to identify the second display sequence, or the freeze display register in the first place.

Finally, the invention is disclosed herein in a form in which the various functions of system 10 are performed by discrete functional blocks. However, any one or more these functions could equally well be performed by one or more appropriately programmed microprocessors, microcoded integrated circuits, application-specific integrated circuits, and so on.

We claim:

1. Apparatus for displaying information having a predetermined address and comprising:

a screen;

at least one memory comprising a plurality of memory elements, each memory element storing display data;

means for reading the memory elements;

means for displaying on said screen information based on the display data stored in the memory elements read by the reading means;

means for receiving messages each including an address field and a data field; and means for accepting the received messages whose address fields match said predetermined address, the data field of an accepted message comprising a sequence of data words each including at least a first subword, the first subword of each data word in the sequence identifying a memory element, a subset of the memory elements identified by first subwords of the data words being read by the reading means for display in an order identical to that of the corresponding first subwords in the sequence.

2. The apparatus of claim 1 wherein each data word also includes a second subword defining a duration of an interval during which the displaying means displays information based on the display data stored in the memory element identified by the first subword in the same data word as the second subword.

3. The apparatus of claim 1 further comprising a button; and means for selecting said subset of the memory elements to be read by the reading means only when said button is pressed.

4. The apparatus of claim 1 further comprising a second screen; second means for displaying on said second screen information based on the display data stored in the memory elements read by the reading means; and means for selecting said subset of the memory elements to be read by the reading means to display on said second screen information based on the display data stored in said subset of the memory elements.

5. The apparatus of claim 1 wherein each memory element is a register.

6. The apparatus of claim 1 wherein the screen is of a liquid-crystal type.

7. A method for use in an apparatus for displaying information, said apparatus having a predetermined address and comprising a screen, and at least one memory comprising a plurality of memory elements, each memory element storing display data, said method comprising the steps of:

reading the memory elements using a reading means;

displaying on said screen information based on the display data stored in the memory elements read by the reading means;

receiving messages each including an address field and a data field; and accepting the received messages whose address fields match said predetermined address, the data field of an accepted message comprising a sequence of data words each including at least a first subword, the first subword of each data word in the sequence identifying a memory element, a subset of the memory elements identified by first subwords of the data words being read by the reading means for display in an order identical to that of the corresponding first subwords in the sequence.

8. The method of claim 7 wherein each data word also includes a second subword defining a duration of an interval during which information is displayed based on the display data stored in the memory element identified by the first subword in the same data word as the second subword.

9. The method of claim 7 wherein said system further comprises a button, said method further comprising the step of selecting said subset of the memory elements to be read by the reading means only when said button is pressed.

10. The method of claim 7 wherein said system further comprises a second screen, said method further comprising the steps of displaying on said second screen information based on the display data stored in the memory elements read by the reading apparatus; and selecting said subset of the memory elements to be read by the reading means to display on said second screen information based on the display data stored in said subset of the memory elements.

11. A system for displaying information comprising:

control means including means for providing messages each including an address and a data field;

a multiplicity of electronic displays communicatively coupled with the control means, each display having a respective address and comprising:

a screen;

at least one memory comprising a plurality of memory elements, each memory element storing display data;

means for reading the memory elements;

means for displaying on said screen information based on the display data stored in the memory elements read by the reading means; and means for accepting messages provided by the control means, addresses of the accepted messages being identical to said respective address, the data field of an accepted message comprising a sequence of data words each including at least a first subword, the first subword of each data word in the sequence identifying a memory element, a subset of the memory elements identified by first subwords of the data words being read by the reading means for display in an order identical to that of the corresponding first subwords in the sequence.

12. The system of claim 11 wherein each data word also includes a second subword defining a duration of an interval during which the displaying means displays information based on the display data stored in the memory element identified by the first subword in the same data word as the second subword.

13. The system of claim 11 further comprising a button; and means for selecting said subset of the memory elements to be read by the reading means only when said button is pressed.

14. The system of claim 11 further comprising a second screen; second means for displaying on said second screen information based on the display data stored in the memory elements read by the reading means; and means for selecting said subset of the memory elements to be read by the reading means to display on said second screen information based on the display data stored in said subset of the memory elements.

15. The system of claim 11 wherein each memory element is a register.

16. The system of claim 11 wherein the screen is of a liquid-crystal type.

17. The system of claim 11 wherein said respective address is unique with respect to addresses of other displays.

18. A method for use in a system for displaying information, said system comprising control means and at least one display apparatus communicatively coupled with the control means, said display apparatus having a predetermined address and comprising a screen, and at least one memory comprising a plurality of memory elements, each memory element storing display data, said method comprising the steps of:

providing from said control means messages each including an address and a data field;

reading the memory elements using a reading apparatus;

displaying on said screen information based on the display data stored in the memory elements read by the reading apparatus; and accepting by said display apparatus messages provided by the control means, addresses of the accepted messages being identical to said predetermined address, the data field of an accepted message comprising a sequence of data words each including at least a first subword, the first subword of each data word in the sequence identifying a memory element, a subset of the memory elements identified by first subwords of the data words being read by the reading apparatus for display in an order identical to that of the corresponding first subwords in the sequence.

19. The method of claim 18 wherein each data word also includes a second subword defining a duration of an interval during which information is displayed based on the display data stored in the memory element identified by the first subword in the same data word as the second subword.

20. The method of claim 18 wherein said system further comprises a button, said method further comprising the step of selecting said subset of the memory elements to be read by the reading apparatus only when said button is pressed.

21. The method of claim 18 wherein said system further comprises a second screen, said method further comprising the steps of displaying on said second screen information based on the display data stored in the memory elements read by the reading apparatus; and selecting said subset of the memory elements to be read by the reading apparatus to display on said second screen information based on the display data stored in said subset of the memory elements.

22. The method of claim 18 wherein said system has a plurality of display apparatuses each having a different address, and wherein said predetermined address of said display apparatus is unique with respect to addresses of other display apparatuses.

* * * * *